United States Patent [19]
Mobley

[11] Patent Number: 5,511,848
[45] Date of Patent: Apr. 30, 1996

[54] PICKUP TRUCK BED

[76] Inventor: Herbert O. Mobley, 3919 Bus La., Laurel, Mont. 59044

[21] Appl. No.: 343,825

[22] Filed: Nov. 22, 1994

[51] Int. Cl.$^6$ ...................................................... B60P 1/00
[52] U.S. Cl. ........................... 296/183; 280/795; 296/204
[58] Field of Search .................................. 296/183, 37.6, 296/204, 100, 187, 203, 205; 280/781, 785, 789, 790, 795, 901

[56] References Cited

U.S. PATENT DOCUMENTS

| | | | |
|---|---|---|---|
| 2,816,794 | 12/1957 | Temp | 296/183 X |
| 3,163,434 | 12/1964 | Krueger | 296/183 X |
| 4,215,898 | 8/1980 | Ulics | 296/183 |
| 4,685,695 | 8/1987 | Le Vee | 296/37.6 X |
| 4,695,087 | 9/1987 | Hollrock | 296/100 X |
| 4,824,158 | 4/1989 | Peters et al. | 296/37.6 |
| 5,035,462 | 7/1991 | Pagg et al. | 296/183 |
| 5,056,855 | 10/1991 | Moravsky | 296/100 X |
| 5,125,710 | 6/1992 | Gianelo | 296/37.6 X |
| 5,267,773 | 12/1993 | Kalis, Jr. et al. | 296/183 |

*Primary Examiner*—David M. Mitchell
*Assistant Examiner*—Kia M. Robinson
*Attorney, Agent, or Firm*—Risto A. Rinne, Jr.

[57] ABSTRACT

A pickup bed includes a lower plane having opposite ends and opposite sides and being disposed over a plurality of elevating members, each of the elevating members disposed atop the frame of a pickup truck and perpendicular with respect to a longitudinal axis of the truck. A pair of upstanding walls having a lower edge and an upper edge are disposed on the opposite sides at the lower edge thereof perpendicular with respect to the plane of the lower plane and parallel with the longitudinal axis. A pair of outer elevated planes are each attached at a first edge thereof to the upper edge of each of the upstanding walls and are attached at a second edge thereof to a supporting frame structure assembly that is disposed about the perimeter of the bed. The supporting frame structure assembly is adapted for transferring the weight of a cargo item placed on the bed to the frame.

18 Claims, 3 Drawing Sheets

5,511,848

PICKUP TRUCK BED

BACKGROUND OF THE INVENTION

1. Field of the Invention

The present invention, in general, relates to truck bodies and, more particularly, to pickup truck beds.

Replacement and factory new pickup truck beds are known. However most beds provide either a "flat bed" type of a bed for placing large items thereupon or a recessed type of a pickup box for holding cargo items therein.

It is at times necessary for pickup truck operators to transport cargo items that will fit inside of any given pickup truck box and again at other times to transport items too large to fit into a pickup box. Accordingly for such kinds of cargo items, a flat bed is necessary.

Certain larger cargo items occasionally tend to be quite heavy. For example when a pickup truck is used to transport a vehicle, it will of course require that the bed be large enough to accommodate the vehicle. Therefore a flat bed type of a truck bed is preferred for this purpose.

Furthermore, all of the weight of the vehicle that is being carried by a flat bed is transmitted to the load bearing surface by the wheels and they are disposed on the outside perimeter of the vehicle (on both sides thereof). Accordingly, the flat bed must be capable of bearing great weight at the outer sides.

Known types of prior replacement truck beds may appear, at first appearance, to accomplish the objects as set forth by the present disclosure, yet they fail to provide a truck bed that provides both the benefits of a pickup box as well as the benefits of a flat bed type of a pickup bed that is suitable for bearing great weight at the outside portions thereof.

Accordingly there exists today a need for a pickup bed that provides both a box having a lower plane useful for containing and supporting smaller items therein and a pair of outer elevated planes that are adapted for receiving and supporting heavier cargo items thereon.

2. Description of Prior Art

Replacement pickup truck beds are, in general, known. For example, the "KARRY-ALL" line of bodies as manufactured by the "Knapheide" company represent the closest known prior art. However no truck bodies having the structure and providing the benefits of the present disclosure are known.

While the structural arrangements of the above described devices, at first appearance, have similarities with the present invention, they differ in material respects. These differences, which will be described in more detail hereinafter, are essential for the effective use of the invention and which admit of the advantages that are not available with the known prior devices.

OBJECTS AND SUMMARY OF THE INVENTION

It is an important object of the present invention to provide a pickup bed that provides a pickup box having a lower plane that is adapted for receiving smaller types of cargo items therein.

It is also an object of the invention to provide a pickup bed that provides pair of outer elevated planes adapted for receiving heavy types of cargo items thereon.

Still another object of the invention is to provide a pickup bed that mounts as low as possible with respect to the frame of the pickup truck.

Yet another object of the invention is to provide a pickup bed that is inexpensive to manufacture.

Yet another important object of the invention is to provide a pickup bed that can be modified to include additional storage compartments that are disposed underneath the elevated outer planes.

Still yet another important object of the invention is to provide a pickup bed that can be modified to include a protective barrier that is disposed intermediate the bed and the rear window of the truck.

Still yet another very important object of the invention is to provide a pickup bed that is adapted to receive an intermediate plate disposed between the pair of elevated outer planes.

Briefly, a pickup bed that is constructed in accordance with the principles of the present invention has a lower plane surface disposed as low as possible with respect to a frame of a pickup sufficient to provide clearance above a gas tank of the pickup and supported by elevating members that are disposed perpendicular with respect to a longitudinal axis of the frame. A pair of upstanding side walls are each attached at a first end to opposite sides of the lower plane. A pair of outer elevated planes extend outward with respect to the center lower plane from a second end of each of the pair of upstanding side walls. A supporting frame structure extends around the entire perimeter of the vehicle and substantially transfers the weight of any cargo items placed on the pair of outer elevated planes to the frame structure of the vehicle.

DETAILED DESCRIPTION OF THE INVENTION

Figure 3:
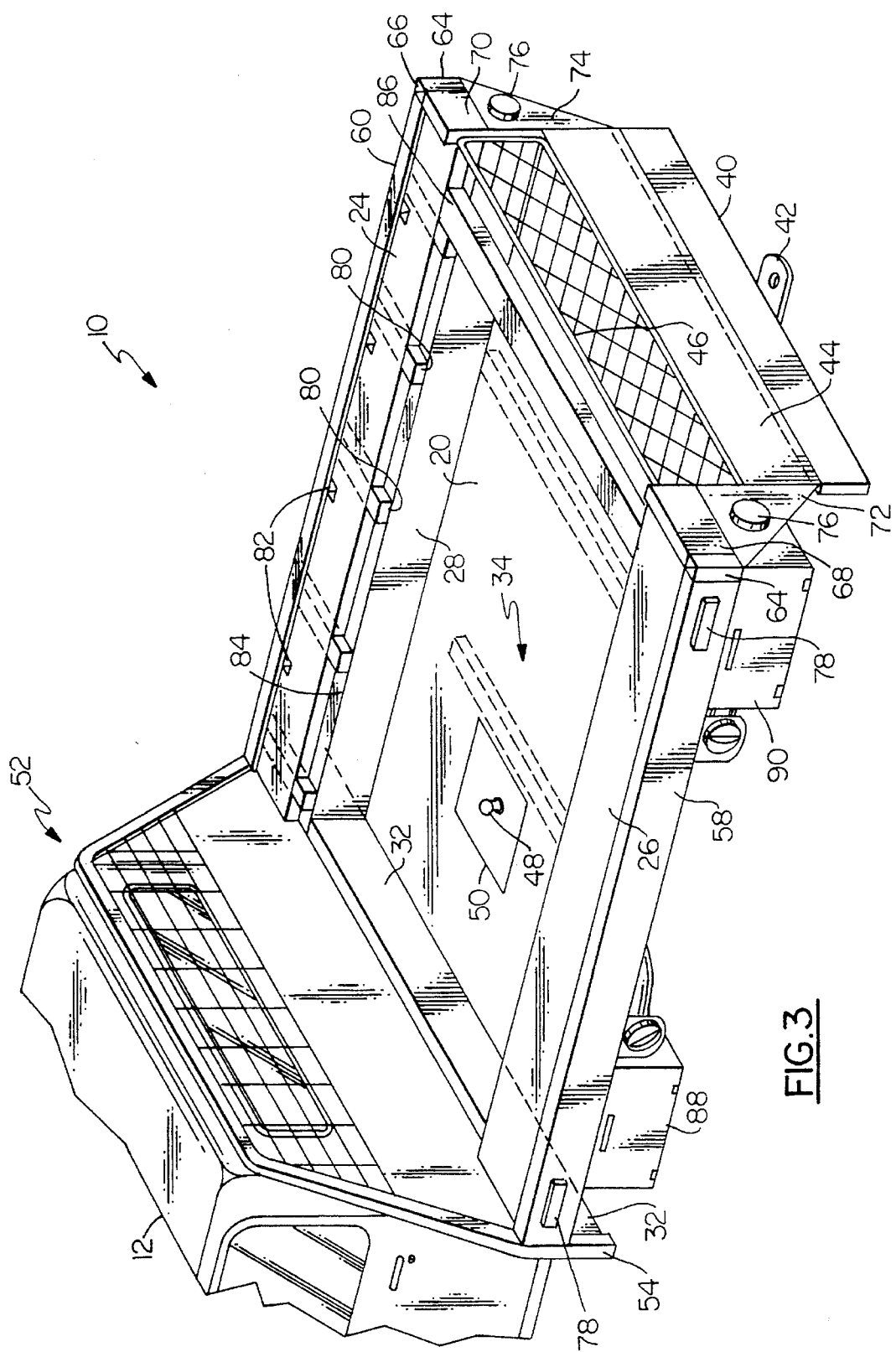
FIG. 3 is a view in perspective of the pickup truck bed attached to a pickup truck.

Referring initially to FIG. 3 and then on occasion to all of the figure drawings is shown, a pickup truck bed, identified in general by the numeral 10.

Figure 1:
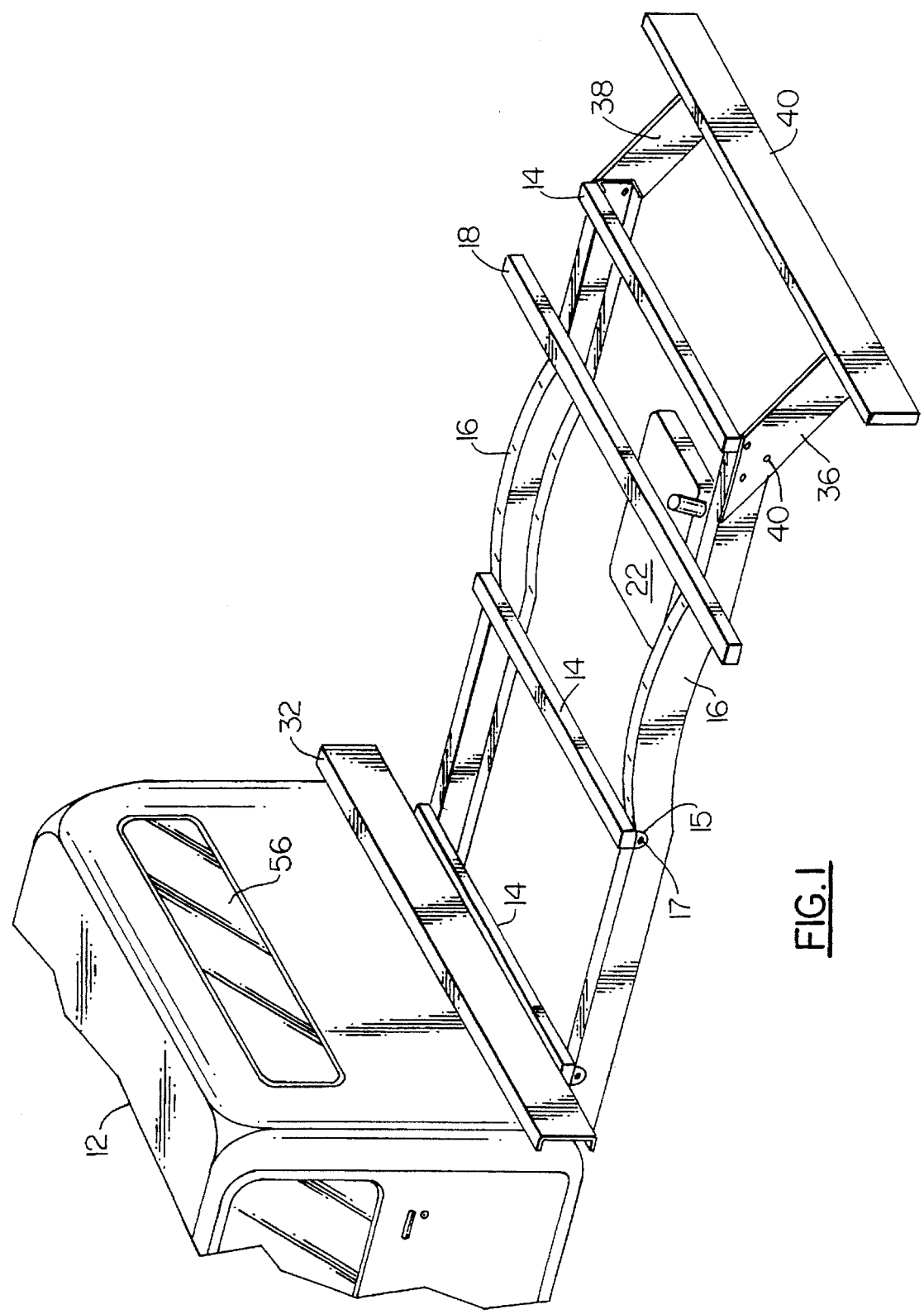
FIG. 1 is a view in perspective of certain of the frame members of the pickup truck bed shown disposed over the frame of a pickup truck.
Figure 2:
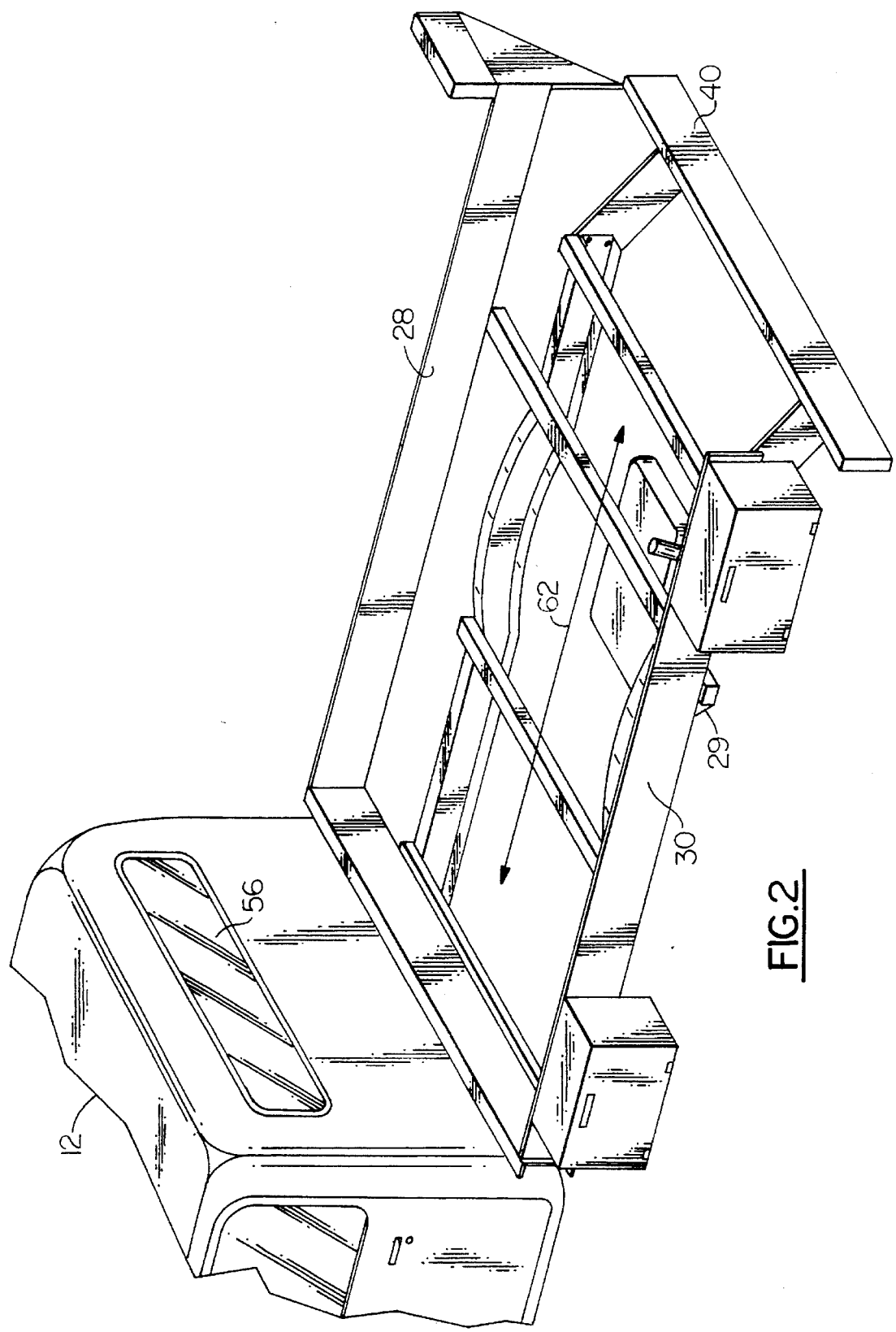
FIG. 2 is a view in perspective of additional members of the pickup truck bed shown disposed over the frame of a pickup truck.

For purposes of clarity FIG. 1 shows, disposed over the frame of a pickup truck 12, only certain of the members which comprise the pickup truck bed 10. FIG. 2 shows additional members and FIG. 3 shows assembled the bed 10 on the truck 12. Accordingly it is possible to see the relationship of components without any of the possible confusion which might result from showing the bed 10 and by either simultaneously showing the various components as hidden lines or as alternative views.

However, the members of the bed 10 which are shown in FIGS. 1 and 2 are not intended to suggest any particular order of assembly. The bed 10, including all of the various component parts thereof, may be assembled in any preferred order, either on or off of the truck 12.

Referring now primarily to FIG. 1, a plurality of elevating members 14 are placed atop a pair of frame members 16 of the truck 12 perpendicular with respect to a longitudinal axis (identified by reference numeral 62, FIG. 2) of the frame 16. A longer elevating member 18 that has a length greater than that of the elevating members 14 is also shown similarly disposed on the frame 16.

The elevating members 14 are approximately the same overall length as is distance from the outside edge of one of the pair of frame members 16 to the outside edge of the remainder of the pair of frame members 16 thereby spanning the distance therebetween. A mounting bracket 15 is attached, normally by welding, to the elevating members 14. The mounting bracket 15 is then attached to the frame 16 by drilling a hole (not shown) through the frame 16 and by the use of a bolt 17.

Additional mounting brackets (not shown) are attached to any of elevating members 14, the longer elevating member 18, or to any of the other component parts of the bed 10, some of which are not yet described, to adequately attach the bed to the frame 16 of the truck 12.

The longer elevating member 18 and the shorter elevating members 14 in aggregate provide a supporting frame structure for a lower plane (identified by reference numeral 20, FIG. 3) and are selected for their size and load bearing characteristics so as to elevate the lower plane 20 a sufficient amount over a fuel tank 22 whilst still maintaining the lower plane 20 as close to the frame 16 as possible and also to support the weight of a cargo (not shown) placed thereon.

When compared with conventional factory truck bodies (not shown), the lower plane 20 of the bed 10 is disposed considerably closer with respect to the frame 16. Accordingly this particular design attribute allows for easier access to the lower plane 20 and also, as is discussed in greater detail hereinbelow, to a pair of outer elevated planes (identified by reference numerals 24 and 26, FIG. 3).

The longer elevating member 18 and the shorter elevating members 14 are preferably square stock although any desired stock having the desired strength and dimensional attributes may be used. For example, rectangular stock, channel, or other materials formed of any metallic or composite material are anticipated for use with any of the component parts of the bed 10. Different size and types of material stock are anticipated for use where desired. For example, certain of the elevating members 14 can be a certain dimension while others are of a different dimension or of a different material stock.

The length of the longer elevating member 18 is selected so as to provide additional support for a pair of upstanding walls (identified by reference numerals 28, 30 FIGS. 2 and 3). The longer elevating member 18 is attached at both ends thereof to the lower edge of each of the pair of upstanding walls 28, 30 by a support bracket 29 (FIG. 2) that is bolted of welded thereto to provide support as necessary. Additional longer elevating members (not shown) are included as desired.

The pair of upstanding walls 28, 30 are each attached to opposite sides of the lower plane 20 and are disposed perpendicular thereto whilst being substantially parallel with the longitudinal axis of the frame 16.

The lower plane 20 is disposed atop the longer elevating member 18 and the shorter elevating members 14. The lower plane 20 includes two opposing sides disposed on opposite sides thereof that align with the pair of upstanding walls 28, 30 and it also includes two opposing ends that are disposed perpendicular with respect to each of the two sides. The pair of upstanding walls 28, 30 are disposed so that the lower edge thereof aligns with the lower plane 20.

Referring momentarily again to FIG. 1, a channel frame member 32 is disposed atop one of the elevating members 14 that is disposed on the frame 16 closest to the cab of the truck 12. As will be described in greater detail hereinbelow, an important design characteristic of the bed 10 is that it includes a supporting frame structure which traverses the full perimeter of the bed 10.

The components which comprise the supporting frame structure are each described separately throughout the specification and, after each have been described, they are summarized hereinbelow. It is a benefit of the perimeter disposed supporting frame structure to provide support so that the pair of outer elevated planes 24, 26 can support heavy cargo thereon. The supporting frame structure transfers the weight of the cargo items placed on the pair of outer elevated planes 24, 26 to the frame 16.

The channel frame member 32 also forms a third upstanding wall (See FIG. 3) of the bed 10. The channel frame member 32 is part of a perimeter supporting frame structure assembly as is described in greater detail hereinbelow. Clearly the channel frame member 32 transfers the weight of any cargo or load that it experiences to the elevating member 14 that is disposed under it which in turn transfers the weight to the frame 16.

For general purposes it is understood that any of the component parts of the bed 10 described herein are fastened together by any preferred method such as by welding or by bolting or by additional brackets (not shown). Also, additional trim pieces (not shown) and further reinforcing components (not shown) are added wherever desired to accomplish any particular requirement as shall be obvious to those having benefit of the present disclosure. For example the trim pieces may be added to smooth, or to round an exposed surface of any component herein described.

The channel frame member 32 is preferably formed of channel stock having in general a U-shaped cross section with the flat portion oriented so as to face toward the rear of the truck 12. Accordingly this provides for a smooth third upstanding wall that is disposed perpendicular with respect to each of the pair of upstanding walls 28, 30.

The height of the channel frame member 32 is selected so as to approximate the height of each of the pair of upstanding walls 28, 30 so as to provide a uniform depth of a box (identified in general by reference numeral 34 FIG. 3.). Other physical characteristics of the channel frame member 32 are selected to satisfy structural requirements such as load carrying capacity.

A pair of rear frame extensions 36, 38 are each attached at a first end thereof to the ends of each of the frame members 16 by additional bolts 40 as required. The pair of rear frame extensions 36, 38 angle toward the ground as they serve to extend the frame members 16 rearward.

Accordingly the pair of rear frame extensions 36, 38 provide an effective extension of the frame that is further toward the rear of the truck 12 and is also closer to the ground surface than where the rear of the frame members 16 ended. As such the pair of rear frame extensions 36, 38 are each a component of the perimeter supporting frame structure assembly in that they also serve to transfer the weight of cargo to the frame members 16 in a manner as is described in greater detail hereinbelow.

The pair of rear frame extensions 36, 38 are each attached at a second end thereof to a rear frame member 40 such as by welding or by bolting. The rear frame member 40 is part of the perimeter supporting frame structure assembly and it is disposed in a parallel and spaced apart relationship with respect to the channel frame member 32 at opposite ends of the lower plane 20.

Any load as caused by the weight of cargo that bears ultimately on the rear frame member 40 is transferred then through each of the pair of rear frame extensions 36, 38 to the frame 16 itself. A hitch 42 is shown (FIG. 3) attached to the rear frame member 40 for the towing of a trailer (not shown). Any type of preferred hitch, such as a receiver hitch (not shown), may of course be used and attached to the rear frame member 40.

A center rear panel member 44 is attached atop the rear frame member 40 and has generally the same overall length. The height of the center rear panel member 44 is selected so as to align the top thereof with one of the opposite ends of the lower plane 20 that is disposed furthest toward the rear of the truck 12. The center rear panel member 44 is attached as desired to the lower plane 20 and thereby provides support for any cargo item placed thereon by transferring the weight to the rear frame member 40.

A tailgate 46 is attached by hinges (not shown) either to the lower plane 20 or to either of the pair of upstanding walls 28, 30 or it is mounted as desired so as to be removable as a unit and it is generally disposed above the center rear panel member 44.

Together the tailgate 46, the pair of upstanding walls 28, 30, and the channel frame member 32 along with the lower plane 20 form the box 34 that is useful for placing cargo items therein. The bottom of the box 34 (which is the top of the lower plane 20) is disposed as low as possible above the fuel tank 22 of the vehicle.

Also shown disposed near the center of the box 34 is a second hitch 48 that is attached as desired to either the lower plane 20, the elevating members 14 (or 18), or the frame members 16. The second hitch 48 is useful for towing a "fifth wheel" (not shown) type of a trailer. The second hitch 48 may be mounted so that it is exposed above the lower plane 20 or it may be mounted so that it is beneath the lower plane 20 and is therefore accessed for use by first removing a cover plate 50.

A protective barrier, identified in general by the reference numeral 52, FIG. 3, includes a main frame tube 54 that is attached at each end thereof to each of the ends of the channel frame member 32. Accordingly, the barrier 52 is therefore also a part of the perimeter supporting frame structure assembly in that any load applied to the barrier 52 is transferred to the channel frame member 32.

The barrier 52 also serves to protect a rear window 56 from impact from any of the cargo which may settle during motion of the truck 12. Attached to each end of the main frame tube 54 of the barrier 52 are a first end each of a pair of main longitudinal frame members 58, 60. The main longitudinal frame members 58, 60 are an essential part of the perimeter supporting frame structure assembly as is described in greater detail hereinbelow.

The main longitudinal frame members 58, 60 are disposed in a spaced apart relationship in parallel alignment with the longitudinal axis of the frame 16 and each have a longitudinal axis that is approximately at the same elevation above the frame 16 of the truck 12 as is the top surface of each of the pair of upstanding walls 28, 30. However the main longitudinal frame members 58, 60 are disposed in a spaced apart relationship with respect to each of the pair of upstanding walls 28, 30 so as to be disposed further away from the center longitudinal axis 62 (FIG. 2) than are either of the pair of upstanding walls 28, 30.

The second end of each of the main longitudinal frame members 58, 60 is attached to a corner member 64. The corner member 64 preferably includes a hollow center 66 adapted for inserting a stake (not shown) therein. Square tubing is preferred for construction of each of the corner members 64.

Attached to each of the corner members 64 at the same elevation above the frame 16 as are the main longitudinal frame members 58, 60 but perpendicular thereto are the first end each of a pair of upper rear frame members 68, 70. The second end each of the pair of upper rear frame members 68, 70 terminate in close proximity to the tailgate 46 near to the ends of each of the pair of upstanding walls 28, 30 to which they may be attached as desired.

A pair of substantially triangular shaped gusset plates 72, 74 are disposed under each of the pair of upper rear frame members 68, 70. Each of the gusset plates 72, 74 is attached to one of the pair of upper rear frame members 68, 70 and also to an end of the center rear panel member 44.

Accordingly, the gusset plates 72, 74 transfer a portion of the weight of any cargo (load) that is experienced by either the main longitudinal frame members 58, 60 or by either of the pair of the upper rear frame members 68, 70, or by the corner members 64 to the center rear panel member 44, and in turn to the rear frame member 40, through the pair of rear frame extensions 36, 38 and to the frame 16 itself.

The principal components of the perimeter supporting frame structure assembly as disclosed thus include the channel frame member 32, a portion of each end of the main frame tube 54, the main longitudinal frame members 58, 60, the corner members 64, the upper rear frame members 68, 70, the elevating member 14 that is disposed under the channel frame member 32, the gusset plates 72, 74, the center rear panel member 44, the rear frame member 40, and the pair of rear frame extensions 36, 38.

The perimeter supporting frame structure assembly provides a method of supporting heavy cargo items, the weight of which is at least partially transferred from the perimeter area of the bed 10 to the frame 16 of the truck 12. Accordingly a method of supporting heavy cargo items when the weight (load) is experienced further away from the longitudinal axis of the box 34 is provided than has been attainable with previous designs.

If desired certain of the components of the perimeter supporting frame structure assembly may be eliminated, as shall now be obvious to those skilled in the art, and the remaining components attached as needed. For example, if desired, the corner members 64 may be omitted from the structure and the main longitudinal frame members 58, 60 may instead be attached at the second ends thereof directly to the upper rear frame members 68, 70 providing, of course, that certain of these components were modified in size to properly cooperate with each other.

A pair of vehicle taillights 76 are shown attached to the gusset plates 72, 74 and a plurality of marker lights 78 are shown attached to one of the longitudinal frame members 58. Other marker lights (not shown) are similarly attached to the remaining longitudinal frame member 60. The taillights 76 and marker lights 78 may be mounted elsewhere on any desired component (not shown) or on special mounting brackets (not shown) provided for the purpose of supporting them.

A plurality of intermediate members 80 are attached at one end thereof to the top surface of each of the pair of upstanding walls 28, 30 and extend away from the longitudinal axis 62 to each of the main longitudinal frame members 58, 60 where they are each attached at a second end thereof to the main longitudinal frame members 58, 60.

The intermediate members 80 are similarly disposed on both sides of the bed 10 but are shown only on one side of the bed 10 for clarity. The intermediate members 80 provide support for the pair of outer elevated planes 24, 26 and serve primarily to transfer much of the weight of any cargo items placed thereon to the main longitudinal frame members 58, 60.

A plurality of stake body holes 82 are provided through the pair of outer elevated planes 24, 26 where desired to permit insertion of optional stake body sides (not shown). Of course the plurality of stake body holes 82 may include reinforcing collars (not shown) as necessary.

A pair of small ledges 84 (only one ledge is shown) which define a plane parallel to that of each of the pair of outer elevated planes 24, 26 but at a slightly lower elevation are provided on each side of the bed 10. The ledges 84 are disposed generally at the same elevation as are the top surfaces of each of the pair of upstanding walls 28, 30.

The bottom surfaces of the intermediate members 80 are on top of the ledges 84. The top surfaces of the intermediate members 80 support the underside of each of the pair of outer elevated planes 24, 26. Therefore the height of the intermediate members 80 also define the differential between the elevation of the ledges 84 as compared to the elevation of the pair of outer elevated planes 24, 26.

The pair of outer elevated planes 24, 26 are each parallel with respect to each other and as such define, in general, an overall plane that is elevated above the the lower plane 20.

An intermediate plate 86 is shown disposed atop the ledge 84 on one side of the bed 10 extending to the ledge (not shown) on the opposite side of the bed 10. Either a plurality of the plates 86 are included as desired or the length dimension of the plate 86 is increased so that a modified intermediate plate (not shown) extends atop the ledges 84 the full length of the bed 10. The intermediate plate 86 thus provides a method to effectively connect both of the outer elevated planes 24, 26 together so that a contiguous plane is provided extending from one of the outer elevated planes 24 to the remaining outer elevated plane 26.

A front disposed tool box 88 is attached to the bed 10 disposed under the outer elevated planes 24, 26 on each side of the bed 10. Similarly a rear disposed tool box 90 is also included on each side of the bed 10, although the face of the rear tool box 90 is angled to correspond with the angle that is provided by the shape of the gusset plates 72, 74. Accordingly the front tool boxes 88 and the rear tool boxes 90 provide additional storage compartments that are disposed underneath the outer elevated planes 24, 26 where they do not interfere with use of either the box 34 or with use of the outer elevated planes 24, 26.

The invention has been shown, described and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A pickup bed adapted for use with a pickup truck said truck having a pair of frame members each of said frame members being disposed substantially parallel with a longitudinal axis of said truck, comprising:

a) a plurality of elevating members adapted to be disposed on said frame members, each of said elevating members disposed in a perpendicular orientation with respect to said longitudinal axis and also disposed substantially parallel with a plane as defined by said frame members;

b) a lower plane having opposite ends and opposite sides said opposite sides being parallel with respect to said longitudinal axis and said opposite ends being perpendicular with respect thereto, said lower plane being disposed on said elevating members;

c) a pair of upstanding walls disposed in a spaced apart relationship that is substantially perpendicular with respect to said lower plane and parallel with respect to said longitudinal axis, each of said pair of upstanding walls having a lower edge and an upper edge, said lower edge disposed at an elevation above said frame members that is substantially equal to the elevation above said frame members that said lower plane is disposed therefrom, and each of said pair of upstanding walls being attached at said lower edge to each of said opposite sides;

d) a pair of outer elevated planes that are disposed parallel with respect to said lower plane, each of said pair of outer elevated planes having a first edge and a second edge, said first edge of each of said pair of outer elevated planes attached near to said upper edge, said second edge disposed further away from said lower plane than said first edge;

e) a supporting frame structure assembly disposed about the perimeter of said pickup bed, said supporting frame structure being attached to said second edge of each of said outer elevated planes; and said supporting frame structure includes means adapted for transferring a portion of the weight of a cargo placed on said pair of outer elevated planes to said frame members.

2. The pickup bed of claim 1 wherein a portion of said elevating members are longer than the remainder thereof, said portion of elevating members being adapted to provide support for said pair of upstanding walls.

3. The pickup bed of claim 1 wherein said supporting frame structure includes a channel frame member disposed atop one of said elevating member that is disposed nearest to a cab of said truck.

4. The pickup bed of claim 3 including a protective barrier having a main frame tube, said tube having two ends, each of said two ends being attached to an opposite end of said channel frame member.

5. The pickup bed of claim 4 wherein said means adapted for transferring includes a pair of rear frame extensions, each of said extensions attached at one end thereof to an end of one of said frame members.

6. The pickup bed of claim 5 wherein each of said pair of rear frame extensions is attached at the remaining end thereof to a rear frame member.

7. The pickup bed of claim 6 wherein a center rear panel member is attached to said rear frame member.

8. The pickup bed of claim 7 wherein said supporting frame structure includes a pair of main longitudinal members disposed parallel with respect to said longitudinal axis, and having a first end and a second end, said first end of each of said pair of main longitudinal members attached to each of said two ends of said main frame tube and having said second edge of each of said pair of outer elevated planes attached thereto.

9. The pickup bed of claim 8 including a pair of upper rear frame members that are each attached to said second end of each of said pair of main longitudinal members, each of said pair of upper rear frame members being disposed perpendicular with respect to said pair of main longitudinal members and parallel with respect to the plane as defined by said pair of outer elevated planes.

10. The pickup bed of claim 9 including a pair of gusset plates each of said gusset plates attached to one of said pair of upper rear frame members and to one end of said rear frame member.

11. The pickup bed of claim 9 including a pair of gusset plates each of said gusset plates attached to one of said pair of upper rear frame members and to one end of said center rear panel member.

12. The pickup bed of claim 9 including a hitch attached to said rear frame member.

13. The pickup of claim 9 including at least one tool box attached where desired to said bed.

14. The pickup bed of claim 1 including a hitch attached to said lower plane.

15. The pickup bed of claim 1 including a pair of ledges, each of said pair of ledges provided atop said upper edge of each of said pair of upstanding walls intermediate said upper edge and said first edge of each of said pair of outer elevated planes.

16. The pickup bed of claim 15 including an intermediate plate, said intermediate plate having opposite ends, each of said opposite ends disposed on each of said pair of ledges whereby said intermediate plate serves to connect said pair of outer elevated planes together, thereby providing an effective larger contiguous plane.

17. The pickup bed of claim 1 including at least one taillight.

18. The pickup bed of claim 1 including at least one marker light.

* * * * *